(12) United States Patent
Kawamoto

(10) Patent No.: US 6,952,860 B2
(45) Date of Patent: Oct. 11, 2005

(54) HINGE STRUCTURE INCORPORATED WITH A ROTARY ACTUATOR

(75) Inventor: Masanobu Kawamoto, Kanagawa (JP)

(73) Assignee: Nifco Inc., Kanagawa (JP)

( * ) Notice: Subject to any disclaimer, the term of this patent is extended or adjusted under 35 U.S.C. 154(b) by 0 days.

(21) Appl. No.: 10/472,686

(22) PCT Filed: Mar. 20, 2002

(86) PCT No.: PCT/JP02/02693

§ 371 (c)(1),
(2), (4) Date: Sep. 22, 2003

(87) PCT Pub. No.: WO02/77472

PCT Pub. Date: Mar. 10, 2002

(65) Prior Publication Data

US 2004/0074049 A1 Apr. 22, 2004

(30) Foreign Application Priority Data

Mar. 22, 2001 (JP) .......................... 2001-82685

(51) Int. Cl.⁷ ................................ E05F 1/14
(52) U.S. Cl. ............................ 16/285; 16/278; 16/279; 16/284; 16/330; 455/575; 455/90; 379/433; 379/433.13
(58) Field of Search .................... 16/285, 278, 279, 16/284; 379/433, 434, 433.13; 455/90, 575

(56) References Cited

U.S. PATENT DOCUMENTS

| | | | | |
|---|---|---|---|---|
| 5,436,954 A | * | 7/1995 | Nishiyama et al. | 455/566 |
| 5,649,309 A | * | 7/1997 | Wilcox et al. | 455/575.3 |
| 5,923,751 A | * | 7/1999 | Ohtsuka et al. | 379/433.13 |
| 5,987,122 A | * | 11/1999 | Daffara et al. | 379/433.13 |
| 6,070,298 A | * | 6/2000 | Sorimachi | 16/330 |
| 6,148,480 A | | 11/2000 | Cooke | 16/303 |
| 6,459,887 B2 | * | 10/2002 | Okuda | 455/90.1 |
| 6,658,111 B2 | * | 12/2003 | Nagashima | 379/433.13 |

FOREIGN PATENT DOCUMENTS

| | | |
|---|---|---|
| JP | 8-125725 | 5/1996 |
| JP | 2001-177266 | 6/2001 |
| JP | 2001-207721 | 8/2001 |
| JP | 2001-251396 | 9/2001 |
| JP | 2002-89542 | 3/2002 |

OTHER PUBLICATIONS

English Language Abstract, Japanese Patent No. JP8–125725, Published May 17, 1996.
English Language Abstract, Japanese Patent No. JP2001–177266, Published Jun. 29, 2001.
English Language Abstract, Japanese Patent No. JP2001–207721, Published Aug. 3, 2001.
English Language Abstract, Japanese Patent No. JP2001–251396, Published Sep. 14, 2001.
English Language Abstract, Japanese Patent No. JP2002–089542, Published Mar. 27, 2002.

\* cited by examiner

*Primary Examiner*—Suzanne Dino Barrett
*Assistant Examiner*—Mark Williams
(74) *Attorney, Agent, or Firm*—MacPherson Kwok Chen & Heid LLP

(57) ABSTRACT

In a hinge structure suitable for use in a foldable mobile phone, the initial unfolding action is effected by converting a pushing stroke of an operating member into a rotational movement of the hinge by using a cam/cam follower mechanism. Thereby, an unexpected reaction force resulting from the inertia force acting between the two parts that are to be unfolded relative to each other can be avoided, and a favorable unfolding action without a shock can be achieved. In particular, it may be arranged such that the hinge is normally urged in the unfolding direction while a clutch is kept engaged to retain the hinge in the fully folded state, and that the hinge is resiliently driven in the unfolding direction by pushing the operating member and thereby disengaging the clutch.

9 Claims, 5 Drawing Sheets

HINGE STRUCTURE INCORPORATED WITH A ROTARY ACTUATOR

TECHNICAL FIELD

The present invention relates to a hinge for joining two members so as to be angularly moveable relative to each other, and in particular to a hinge structure incorporated with a rotary actuator and a spring drive mechanism so as to fold and unfold one member relative to the other.

BACKGROUND OF THE INVENTION

Many of the most current cellular phones are provided with a microphone unit and a speaker unit that are joined by a hinge so as to be unfolded in use and folded not in use. To increase the convenience of such a foldable telephone set, a hinge opening/closing device is disclosed in Japanese patent laid open publication 8-125725 that allows the two parts of the telephone set to be held in the closed or folded state in a stable manner and to be readily unfolded or opened using only one hand. In this hinge opening/closing device, a torsion coil spring is used for providing the rotational drive power to the hinge device.

However, the torsion coil spring stores the maximum amount of rotational energy when the two parts are fully folded, and this energy is released rapidly when a pushbutton is pressed to unfold the two parts so that the resulting reaction could cause a springy motion to the telephone set. Also, the retaining force that keeps the telephone set folded is related to the force required to operate the pushbutton. Therefore, when the retaining force is increased, the force required to operate the pushbutton increases, and this impairs the handling of the telephone set.

Such an inconvenience could be avoided by providing a suitable amount of frictional resistance by using a damper mechanism or weakening the spring force. However, in either case, it is difficult to achieve a suitable initial operating speed, an adequately small operating force and a smooth operation over the entire stroke of operation.

BRIEF SUMMARY OF THE INVENTION

In view of such problems of the prior art, a primary object of the present invention is to provide a hinge structure that can be smoothly folded and unfolded by using a simple structure.

A second object of the present invention is to provide a hinge structure that is favorable for use in a foldable cellular or other mobile phone.

To achieve such objects, the present invention provides a hinge structure including a first part and a second part that are joined to each other so as to be angularly moveable relative to each other, comprising: an operating member axially slidably supported by the first part and having an axially projecting outer end; a first spring member urging the operating member in an outwardly projecting direction; a cam member connected to the operating member and supported by the first part in an axially slidable but rotationally fast manner; and a cam follower member fixedly attached to the second part and adapted to convert an axial movement of the operating member into a rotational movement of the second part relative to the first part.

Thus, because the initial unfolding movement of the hinge structure is effected by a manual action, an unexpected reaction arising from the inertia force acting between the two parts can be avoided from being transmitted to the user, and a highly favorable unfolding action free from a shock can be achieved.

By providing a second spring member that urges the second part in an unfolding direction relative to the first part, the unfolding action is improved even further. In particular, according to the present invention, the spring force of the second spring member may be set relatively weak so that the shock in unfolding the hinge can be reduced even further.

According to a preferred embodiment of the present invention, the hinge structure further comprises a clutch that releases a rotationally fast engagement of the cam follower member relative to the first part via the cam member to place the cam follower member in a freely rotatable manner when the operating member is depressed beyond a prescribed stroke, and the clutch is adapted to retain the rotationally fast state of the cam follower member relative to the first part via the cam member when the first part and the second part are relatively folded one upon the other with the operating member left free. Thereby, an unfolding action relatively free from frictional resistance and a controlled folding action can be achieved so that both the folding and unfolding actions can be optimized.

In particular, it may be arranged such that the hinge is normally urged in the unfolding direction while the clutch is kept engaged to retain the hinge in the fully folded state, and that the hinge is resiliently driven in the unfolding direction by pushing the operating member and thereby disengaging the clutch.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
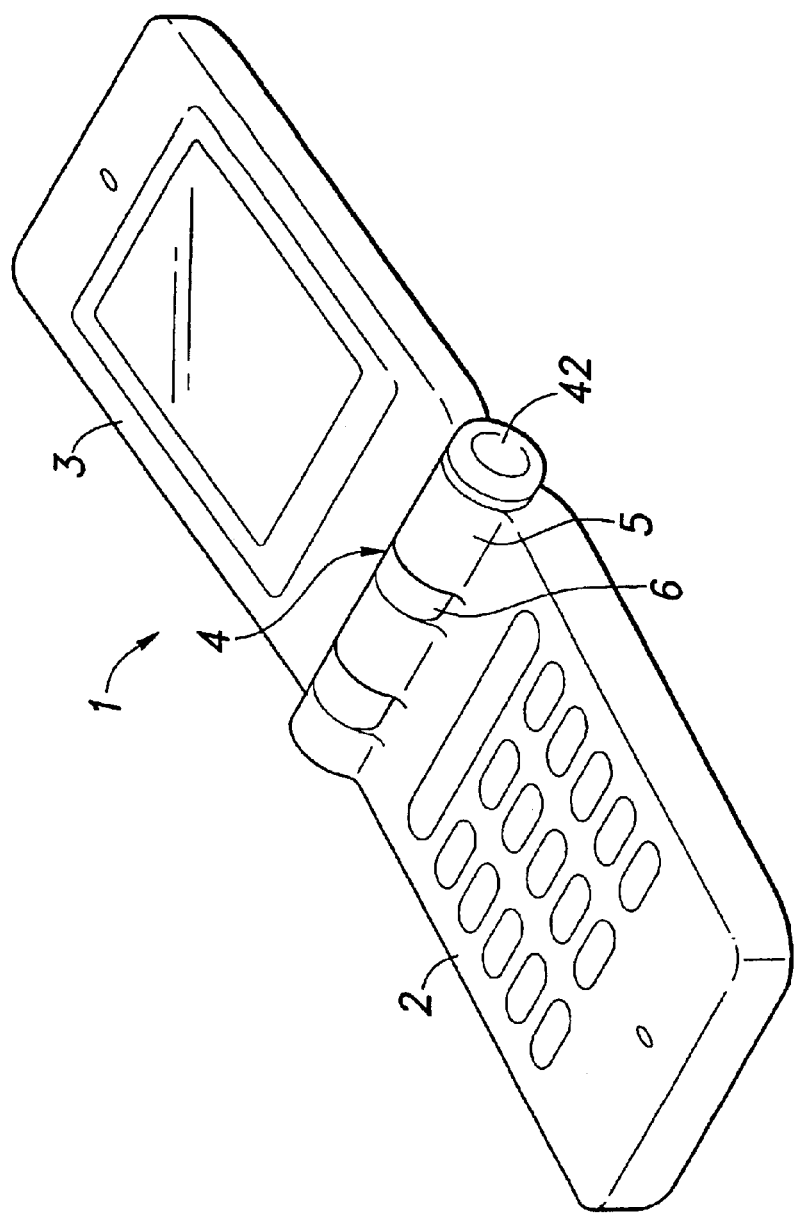
FIG. 1 is an external perspective view of a mobile phone to which the present invention is applied.

FIG. 1 shows the external view of a mobile phone to which the present invention is applied. This mobile phone 1 comprises a microphone unit 2 provided with a keypad, a speaker unit 3 provided with a LCD panel, and a hinge 4 that joins these two units so as to be foldable relative to each other. The basic structure of the telephone set is per se known, and is omitted from the description given hereinafter.

Figure 2:
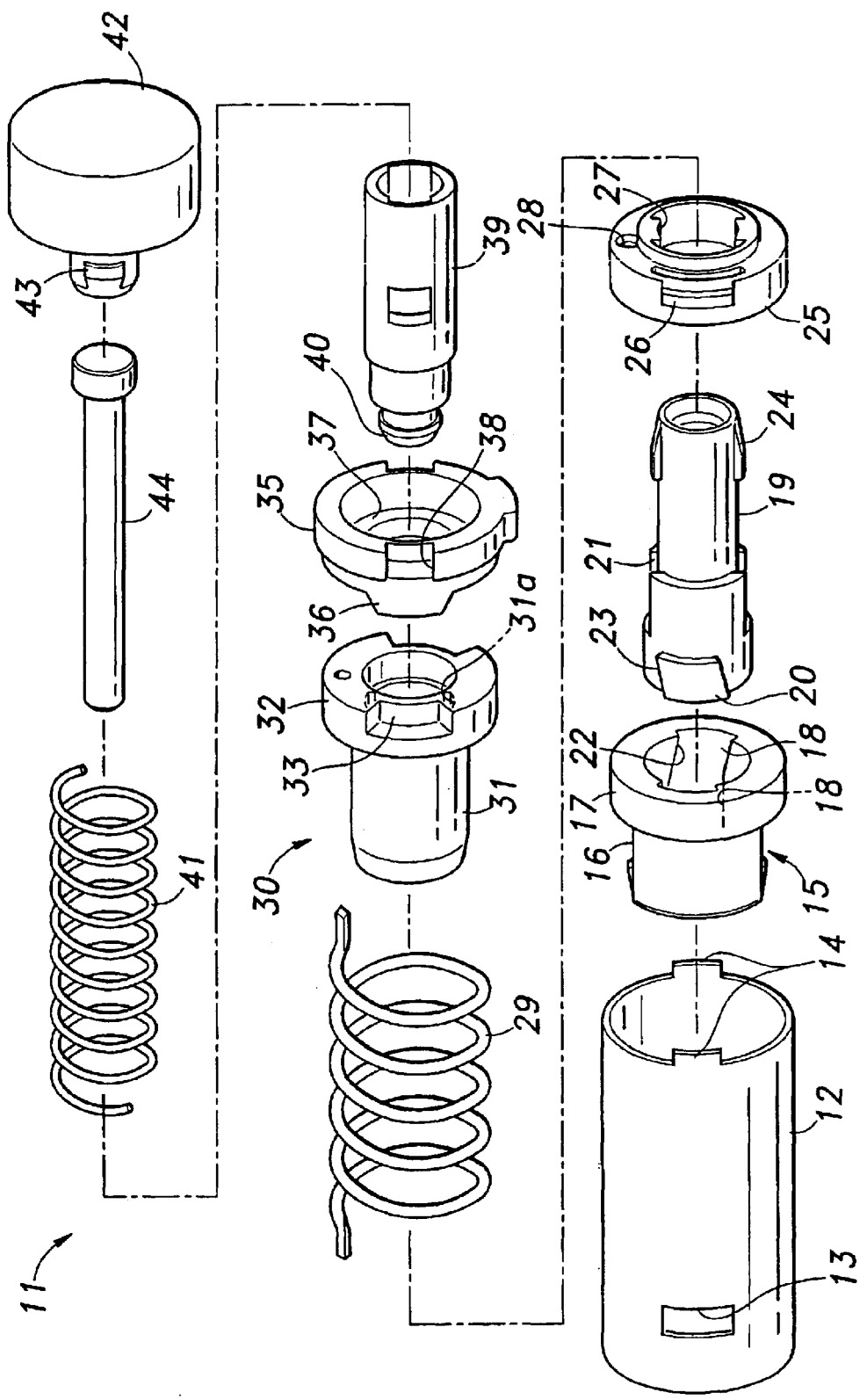
FIG. 2 is an exploded perspective view of the hinge of the mobile phone.
Figure 3:
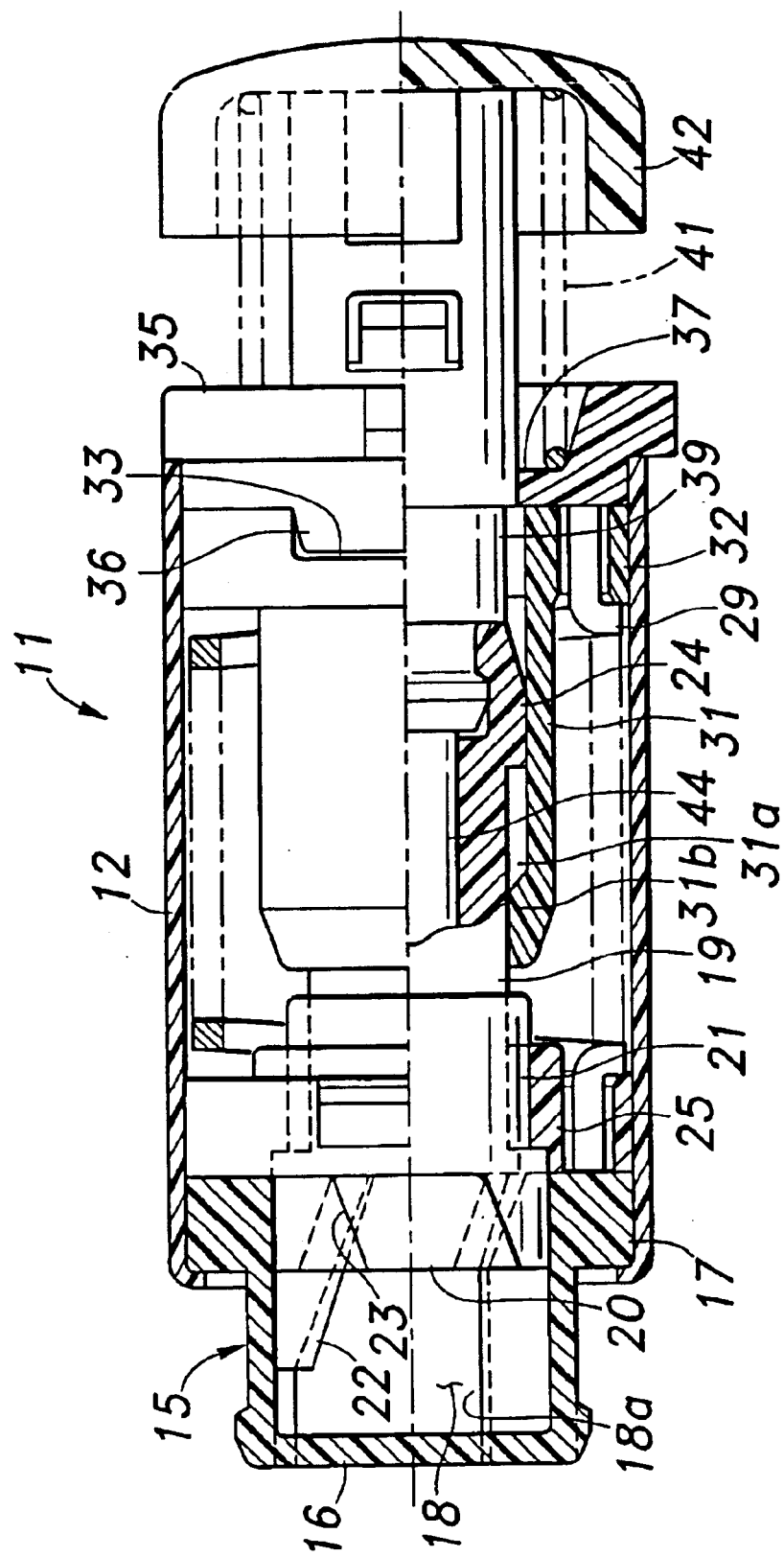
FIG. 3 is a sectional view of the hinge when it is fully folded.

Referring to FIGS. 2 and 3, a cylindrical housing 12 made of metal such as stainless steel and having an inner diameter of approximately 7.4 mm is provided with an inwardly directed radial flange in a left open end thereof in the drawings. This flange is formed by drawing, and performs the function of retaining inner components in place. In the left end of the housing 12 is retained a cam follower member 15 that comprises a main part 16 having a relatively small diameter and projecting out of the open left end of the housing 12 and a flange portion 17 that engages the radial flange of the housing 12. The cam follower member 15 is generally cup-shaped, and a pair of spiral cam grooves 18 are formed on the inner circumferential surface thereof in a mutually symmetric relationship with respect to a central axial line as will be described in more detail hereinafter.

An annular retaining member 25 is received in the housing 12 and abuts the right end of the cam follower member 15. A pair of projections 26 formed on the outer circumferential surface of the retaining member 25 engage corresponding openings 13 of the housing 12 so as to retain the cam follower member 15 in a rotatable but axially fast manner, and retain the retaining member 25 in both rotationally and axially fast manner. The right end of a cylindrical cam member 19 is passed into and retained in the inner bore of the retaining member 25, and the left end of the cam member 19 fits slightly into the right end of the cam follower member 15. Under this condition (the unfolded state of the hinge), a pair of cams 20 formed in the cam member 19 slightly engage the cam grooves 18. As will be described hereinafter, as the cam member 19 moves leftward, the left end of the cam member 19 moves deeper into the cam follower member 15, and the cam follower member 15 rotates relative to the cam member 19 by virtue of the cooperation between the cams 20 and cam grooves 18. A pair of projections 27 are formed on the inner circumferential surface of the retaining member 25, and engage axial grooves 21 formed in an intermediate part of the cam member 19. Each axial groove 21 has a prescribed length so that the projections 27 of the retaining member 25 engage the axial grooves 21 of the cam member 19 so as to retain the cam member 19 in a rotationally fast manner when the depth by which the left end of the cam member 19 is received in the cam follower member 15 is less than a prescribed value. When the depth by which the left end of the cam member 19 is received in the cam follower member 15 becomes greater than the prescribed value, the projections 27 are disengaged from the cam member 19 so that the cam member 19 is allowed to rotate freely.

The cam grooves 18 of the cam follower member 15 and the cams 20 of the cam member 19 engage with each other via cam slopes 22 and 24 having such a spiral angle that an axial movement of the cam member 19 into the cam follower member 15 by a prescribed stroke (1.6 mm, for instance) causes a rotation of the cam follower member 15 by a corresponding angle (10 degrees, for instance). The cam grooves 18 of the cam follower member 15 include linear sections 18a so that the axial movement of the cam member 19 would cease to be converted into a rotational movement of the cam follower member 11 once the cams 19 have advanced in the cam grooves 18 beyond a prescribed distance (1.6 mm, for instance). The total axial stroke of the cam member 19 is approximately 2.4 mm.

The right end of the cam member 19 is passed into a hollow and cylindrical clutch member 30 that comprises a main part 31 disposed on the left end thereof and provided with a relatively small diameter and a flange portion 32 provided on the right end thereof. The right end of the cam member 19 is provided with a pair of projections 24 that engage corresponding axial grooves 31a provided in the inner bore of the clutch member 30 so that the cam member 19 and clutch member 30 are axially slidable relative to each other but rotationally fast with each other. The axial grooves 31a terminate near the left end of the clutch member 30, and define inner engagement portions 31b so that when the cam member 19 is pushed inward in the clutch member 30 by more than a prescribed stroke, the clutch member 30 starts to be forced leftward by the cam member 19 by virtue of the engagement between the inner engagement portions 31b and projections 24.

The right end of the clutch member 30 is engaged by a lid member 35 that is in turn engaged by the axial end of the housing 12 via an annular shoulder formed along the outer periphery of the lid member 35. By crimping tabs 14 formed at the axial end of the housing 12 onto corresponding recesses 38 formed around the outer periphery of the lid member 35, the lid member 35 is integrally secured to the housing 12.

A torsion coil spring 29 is interposed between the retaining member 25 and the flange portion 32 of the clutch member 30 to rotationally urge the clutch member 30 and axially urge the clutch member 30 toward the lid member 35. The axial ends of the coil wire of the torsion coil spring 29 extend axially and fit into axial holes 28 and 34 provided in the retaining member 25 and the flange portion 32 of the clutch member 30, respectively. A pair of axially projecting engagement projections 36 are provided in the inner end of the lid member 35 facing the housing at diametrically opposing positions, and normally (when the hinge is fully folded or unfolded) fit into corresponding recesses 33 of the flange portion 32 of the clutch member 30 to prevent the rotation of the clutch member 30.

A cylindrical connecting member 39 is passed into the central holes of the lid member 35 and clutch member 30, and the free end or left end of the connecting member 39 snap fits into the central hole of the cam member 19 formed on the right end thereof so that the cam member 19 and connecting member 39 are axially joined to each other for integral axial movement.

A compression coil spring 41 is resiliently interposed between an annular shoulder surface formed on the inner periphery of the outer end surface of the lid member 35 and pushbutton 42. A metallic rod 44 is passed into the central bore of the connecting member 39 to transmit the force that pushes the pushbutton 42 inward to the cam member 19 in a reliable manner and with an adequate mechanical strength.

Figure 4:
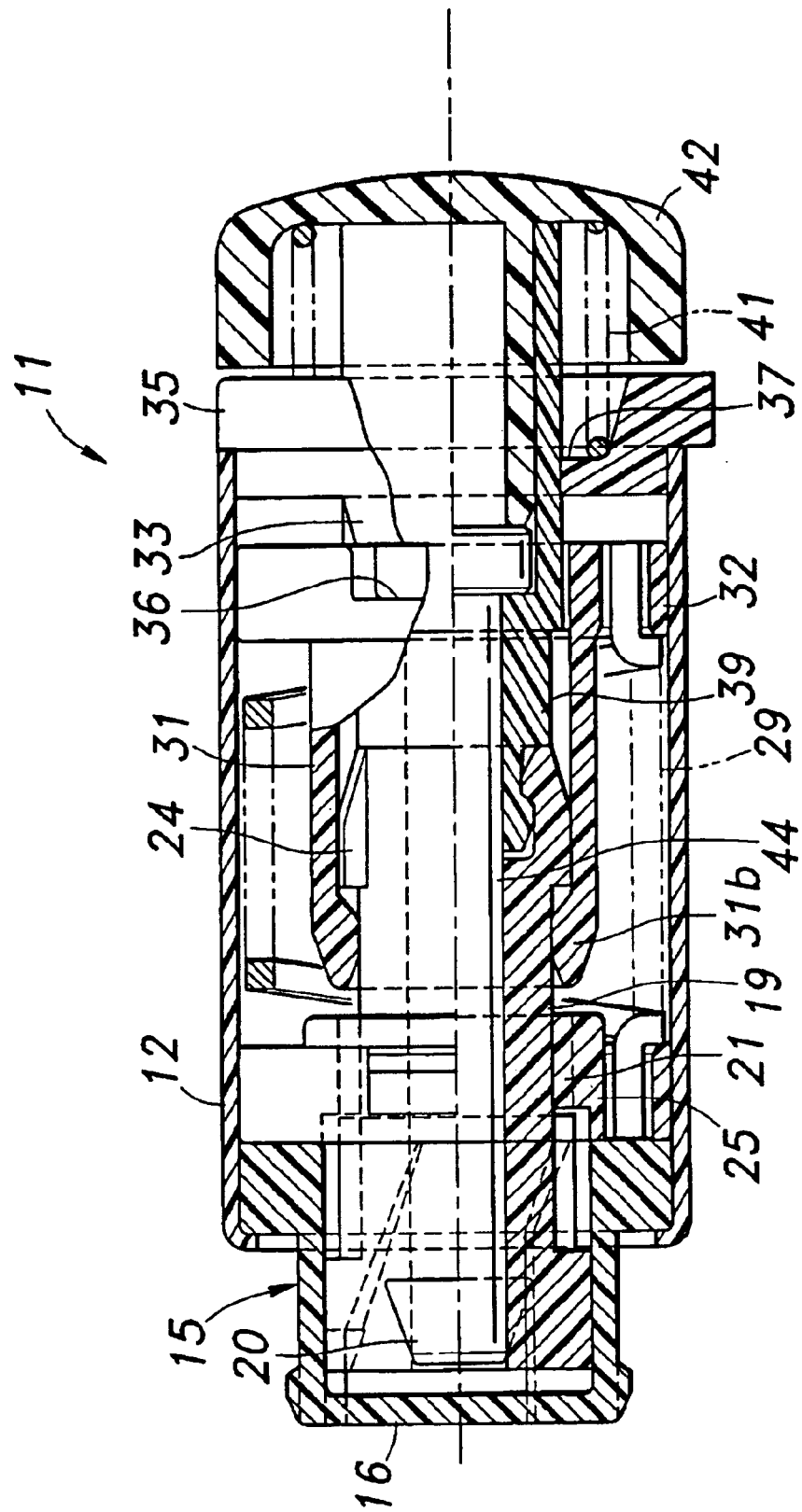
FIG. 4 is a sectional view of the hinge when it is unfolded by pushing the pushbutton.

The mode of operation of the hinge incorporated with a rotary actuator according to the present invention is described in the following additionally with reference to FIG. 4.

When the speaker unit 3 is folded onto the microphone unit 2, the clutch member 30 is pushed rightward by the axial force of the torsion coil spring 29. Under this condition, the projections 36 of the lid member 35 are in engagement with the recesses 32 of the clutch member 30 (the engaged state of the clutch) so that the clutch member 30 is kept rotationally immobile with respect to the housing 12 even though the torsion coil spring 29 applies a rotational force to the clutch member 30. A clutch is thus formed by the projections 36 of the lid member 35, recesses 32 of the clutch member 30 and torsion coil spring 29.

The cam member 19 which is connected to the clutch member 30 so as to be rotationally fast but axially slidable within a prescribed range relative to the clutch member 30 is displaced fully rightward under the axial force of the compression coil spring 41 acting on the pushbutton 42. Furthermore, in this state, the cam member 19 is rotationally fast with the retaining member 25 by virtue of the engagement between the axial grooves 21 and projections 27. Therefore, the cam follower member 15 which is in engagement with the cams 20 on the left end of the cam member 19 is rotationally immobile. Thereby, the speaker unit 3 and microphone unit 2 are kept folded one upon the other.

Figure 5:
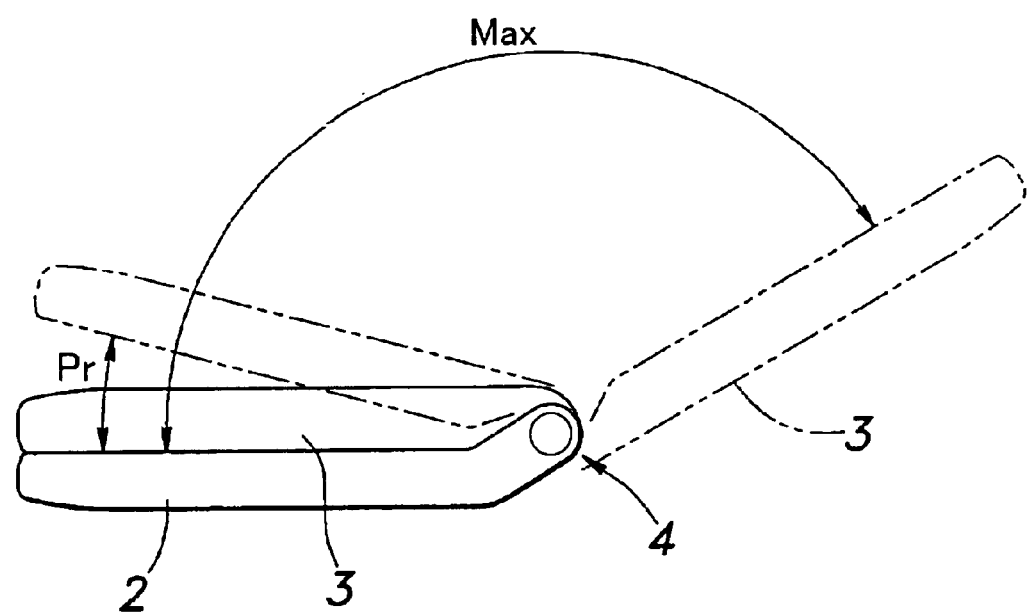
FIG. 5 is a schematic view showing the folding and unfolding action of the mobile phone.

When the pushbutton 42 is pushed leftward by a small stroke (1.6 mm) under this condition, the connecting member 39 integrally joined to the pushbutton 42 moves leftward, and the cam member 19 connected to the inner end of the connecting member 39 moves leftward. Because the cam member 19 is kept rotationally fast relative to the retaining member 25 by virtue of the engagement between the axial grooves 21 and projections 27, the cams 20 on the left end of the cam member 19 move axially leftward without rotating. Therefore, by the action of the cam slopes 22 and 23 defined by the cam grooves 18 and cams 20, the cam follower member 15 rotates. This rotation causes the speaker unit 3 that is integrally connected to the cam follower member 15 to open or unfold by an angle of approximately 10 degrees (angle Pr in FIG. 5).

As the pushbutton 42 is pushed further, the cams 20 of the cam member 19 eventually reach the linear sections 18a of the cam grooves 18 of the cam follower member 15, and the cam follower member 15 ceases to rotate any further. On account of the engagement between the inner engagement portions 31b and projections 24, the continued axially inward movement of the cam member 19 causes the clutch member 30 to move leftward. When the pushbutton 42 has been fully depressed, the projections 36 of the flange 28 of the clutch member 30 disengage from the recesses 33 of the lid member 35 (the disengaged state of the clutch), and the rotationally fast engagement between the retaining member 25 and cam member 19 owing to the engagement between the projections 27 of the retaining member 25 and the axial grooves 21 of the cam member is released at the same time.

As a result, the rotational biasing force of the torsion coil spring 29 normally acting upon the clutch member 30 is released. Because the cam grooves 18 of the cam follower member 15 and cams 20 of the cam member 19 are in a rotationally fast engagement with each other, and cam member 19 and the clutch member 30 are also in a rotationally fast engagement with each other, the clutch member 30, cam member 19 and cam follower member 15 all rotate in a single body. In other words, the microphone unit 2 and speaker unit 3 automatically unfold relative to each other. The maximum unfolding angle (indicated by MAX in FIG. 5) is determined by the mechanically defined unfolding angle of the hinge 4.

Under this condition, because the projections 36 ride over the end surface of the flange 32, the clutch member 30 is prevented from moving rightward in spite of the axial biasing force of the torsion coil spring 29. Similarly, because a rotation preventing means 24 provided between the cam member 19 and the retaining member 25 is at a mismatched phase relationship, the cam member 19 is prevented from moving rightward in spite of the axial biasing force of the compression coil spring 36. As a result, the unfolded state of the hinge is maintained as long as no external force is applied thereto. Under this condition, the pushbutton 42 remains in the fully depressed state.

When the microphone unit 2 and speaker unit 3 are manually folded one over the other against the rotational biasing force of the torsion coil spring 29, the cam follower member 15 and cam member 19 initially rotate together, but once the phase relationship between the projections 27 of the retaining member 25 and axial grooves 21 of the cam member 19 matches up, the axial force of the compression coil spring 36 forces the projections 27 and axial grooves 21 into alignment, and the cam member 19 is forced rightward. At this time, because the cams 20 are engaged by the linear sections 18a of the cam grooves 18, no rotational force is applied to the cam member 19.

Because the rightward axial biasing force of the torsion coil spring 29 normally acts upon the clutch member 30, once the projections 36 of the lid member 35 and recesses 33 of the flange 32 come into alignment with each other, and the clutch becomes engaged. As a result, the rotational biasing force of the coil spring 29 is kept in check. The axial biasing force of the compression coil spring 36 forces only the cam member 19 further rightward, and the cam follower member 15 rotates under the action of the cam slopes 22 and 23 until the microphone unit 2 and speaker unit 3 are completely folded one over the other. Under this condition, the axial biasing force of the compression coil spring 36 keeps the two units in the fully folded state, and the pushbutton 42 is brought back to the fully projecting state.

According to the embodiment described above, a high level of convenience can be achieved for a device that can be folded because the two parts that are mutually folded one over the other are partly unfolded by slightly depressing the pushbutton, and are fully unfolded automatically under the biasing force of a torsion spring by further depressing the pushbutton. The two parts can be folded in the same manner as the conventional device. In particular, the unfolding action takes place in two stages, first by the manual force applied to the pushbutton and transmitted to the cam, and second by the force of the spring. Therefore, the shock when initially unfolding the hinge can be minimized as compared with the convention hinge that relies on the spring force for the initial unfolding action, and the necessary spring force can be reduced because the spring force is not relied upon for the initial unfolding torque. Furthermore, because the hinge is incorporated with a rotary actuator as an independent unit, the same actuator can be used for a number of different devices, and a significant advantage can be gained in simplifying the manufacturing process and components management.

INDUSTRIAL APPLICABILITY

The foregoing description was directed to an application to a mobile telephone set, but the present invention can also be applied to a hinge device for connecting a keyboard unit and a display unit in a laptop computer, and a hinge device for connecting a lid to a main body of a container. The folded state was the normal state in the foregoing embodiment, but the unfolded state may also be the normal state and the hinge may be adapted to automatically fold by suitably selecting the position for engaging the clutch and direction of the torsional biasing force. Additionally, by combining a per se known rotary damper using viscous fluid, an even more smooth action can be achieved.

What is claimed is:

1. A hinge structure including a first part and a second part that are joined to each other so as to be angularly moveable relative to each other, comprising:

an operating member axially slidably supported by said first part and having an axially projecting outer end;

a first spring member urging said operating member in an axially outwardly projecting direction;

a retaining member fixed to said first part;

a second spring member comprising a compression and torsional coil spring having a first end engaged by the retaining member;

a clutch member disposed in an axially slidable and rotatable manner and connected to a second end of said second spring member and an inner end of the operating member;

a first engagement means provided between a clutch retaining member fixed to the first part and the clutch member, the engagement means including a projection provided on either the clutch member or the clutch retaining member, the projection being received in a corresponding recess provided in the other of the clutch member or the clutch retaining member under rest condition and under an axial spring force of the second spring member, and the projecting riding over an end surface of the other of the clutch member or the clutch retaining member against the axial spring force of the second spring member when axially moved from the rest condition;

a cam member provided with a cam and connected to the clutch member in an axially slidable but rotationally fixed manner;

a second engagement means that prevents rotation of the cam member when the clutch member is depressed by less than a prescribed stroke by the operating member and allows rotation of the cam member when the clutch member is depressed beyond the prescribed stroke; and a cam follower member integrally connected to said second part and adapted to cooperate with the cam in such an axially slidable but rotationally fixed manner that an initial axial movement of the cam member forces a rotation of the cam follower;

wherein the second spring member rotationally biases the first and second parts in an opening direction via the intervening members.

2. A hinge mechanism for rotatably coupling a first body and a second body, the hinge mechanism comprising:

an operating member axially slidably supported by the first body such that the operating member can travel an operating distance;

a cam member comprising a first recess and a cam, said cam member being coupled to the operating member and configured to move a first axial distance, wherein the first axial distance comprises a first travel segment and a second travel segment;

a retaining member coupled to the first body, said retaining member being coupled to the cam member such that the retaining member and the cam member are rotationally fixed when the cam member is positioned in the first travel segment and such that the retaining member is rotatable relative to the cam member when the cam member is positioned in the second travel segment;

a cam follower coupled to the second body and slidably engaged with the cam member, the cam follower comprising a groove shaped to receive the cam such that as the cam member moves through the first travel segment, the cam follower rotates relative to the cam member, and as the cam member moves through the second travel segment, the cam follower is rotationally fixed to the cam member;

a lid member coupled to the first body;

a clutch member coupled to the cam member such that the cam member is rotationally fixed with the clutch member, the clutch member comprising a clutch recess configured to engage the lid projection of the lid member to retain the clutch member rotationally fixed to the lid member until the clutch member axially moves a second axial distance from the lid member; and a torsional coil spring coupled to the annular retaining member and the clutch member such that after the clutch member axially moves the second axial distance from the lid member, the torsional coil spring induces rotation of the clutch member relative to the lid member.

3. The hinge mechanism of claim 2, further comprising a compression spring positioned between the lid member and the operating member, the compression spring being configured to apply an expanding force therebetween.

4. The hinge mechanism of claim 2, wherein the cam member is coupled to the operating member by a connecting member disposed therebetween.

5. The hinge mechanism of claim 2, further comprising a housing coupled to the first body, the housing being rotatably coupled to the cam follower, fixedly coupled to the retaining member, and fixedly coupled to the lid member.

6. An device movable from a closed position to an open postion, comprising:

a first body;

a second body;

a hinge mechanism rotatably coupling the first body and the second body, the hinge mechanism comprising:

an operative member movable a first distance between an outward position and an inward position;

a clutch retaining member fixedly coupled to the first body;

a retaining member fixedly coupled to the first body;

a clutch member positioned between the clutch retaining member and the retaining member, the clutch member being axially movable a second distance relative to the clutch retaining member such that for a first portion of the second distance, the clutch member is rotationally fixed to the clutch retaining member, and for a second portion of the second distance, the clutch member is rotatable relative to the clutch retaining member;

a torsion spring having a first end engaging the retaining member and a second end engaging the clutch member;

a cam member coupled to the operative member, the cam member being axially moveable a first distance and engaging the retaining member such that for a first portion of the first distance, the cam member is axially movable but rotationally fixed to the retaining member and for a second portion of the first distance, the cam member is rotatable relative to the retaining member; and a cam follower fixedly coupled to the second body and engaging the cam member such that rotation of the cam member causes rotation of the cam member.

7. The device of claim 6, wherein the first body and the second body comprise components of a cellular telephone.

8. The device of claim 6, wherein the cam follower engages the cam member such that as the cam member travels a third axial distance relative to the cam follower, the cam member rotates the cam follower relative to the cam member.

9. The device of claim 8, wherein:

the cam member comprises a cam; and the cam follower comprises a groove engaging the cam, wherein the groove has a changing angular position along an axial length of the cam follower.

* * * * *